Figure 1:
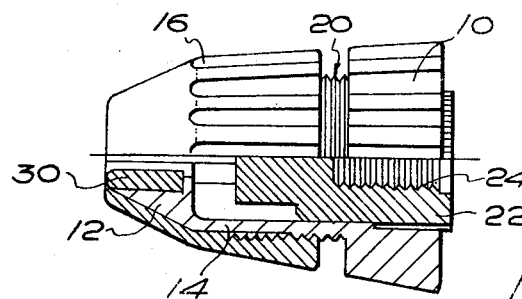

United States Patent [19]
Derbyshire

[11] 4,097,054
[45] Jun. 27, 1978

[54] DRILL CHUCKS

[75] Inventor: George Cecil Derbyshire, Sheffield, England

[73] Assignee: The Jacobs Manufacturing Company, Limited, Sheffield, England

[21] Appl. No.: 726,184

[22] Filed: Sep. 24, 1976

[30] Foreign Application Priority Data

Oct. 7, 1975 United Kingdom ............... 41056/75

[51] Int. Cl.² .............................................. B23B 31/04
[52] U.S. Cl. ........................................ 279/64; 279/60
[58] Field of Search ....................... 297/60, 61, 62, 63, 297/64, 65

[56] References Cited

U.S. PATENT DOCUMENTS

| 1,318,090 | 10/1919 | Knebel | 279/64 |
| 1,489,976 | 4/1924 | Brown | 279/59 X |
| 1,764,291 | 6/1930 | Emrick | 279/60 |
| 1,985,586 | 12/1934 | Stoner | 279/60 |

Primary Examiner—Gil Weidenfeld
Attorney, Agent, or Firm—Stephen J. Rudy

[57] ABSTRACT

A chuck for drills and the like including at least three jaw elements of tapered form connected to a jaw carrier by means of flexible elements. Means are provided for urging the jaw elements axially relative to a nose cone so that they act against a frusto-conical bore portion of said nose cone and are urged radially inwards, accompanied by flexing of the flexible elements, to grip the shank of a drill or the like.

9 Claims, 36 Drawing Figures

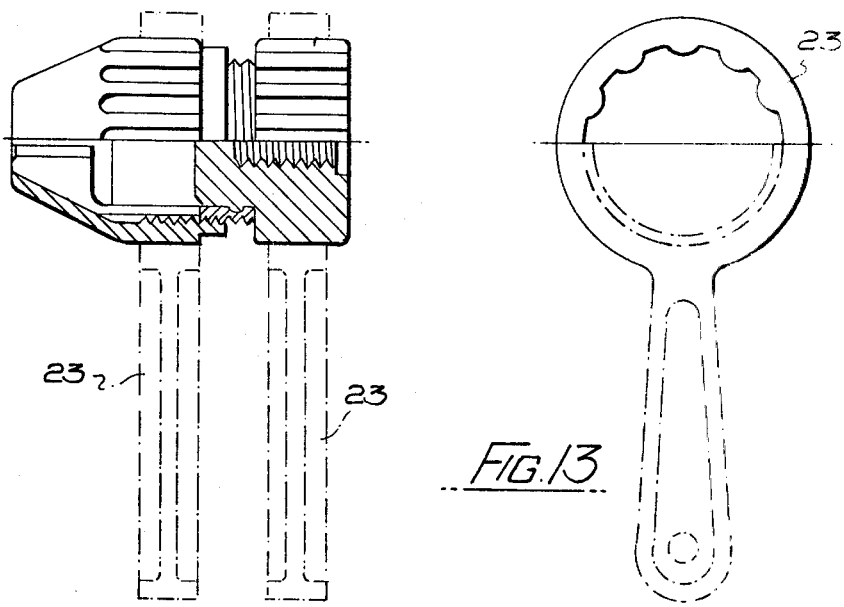
FIG. 12
FIG. 13
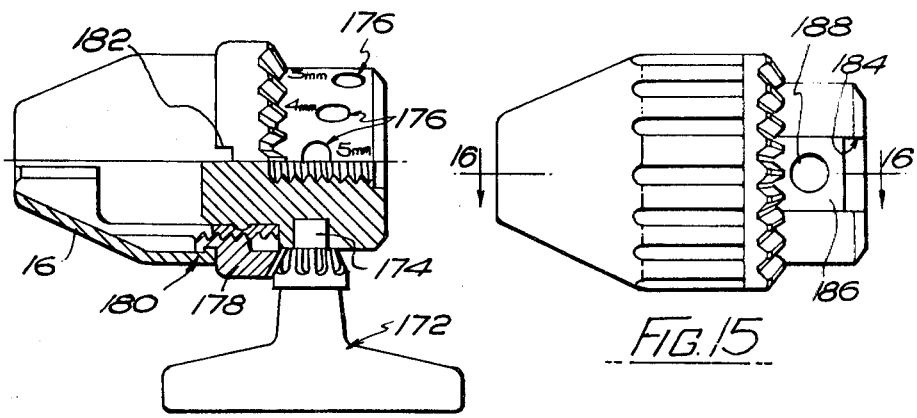
FIG. 14
FIG. 15
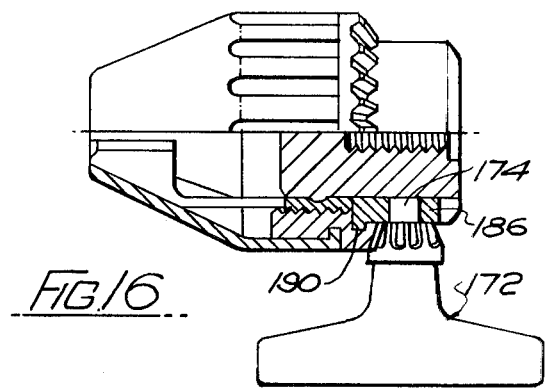
FIG. 16

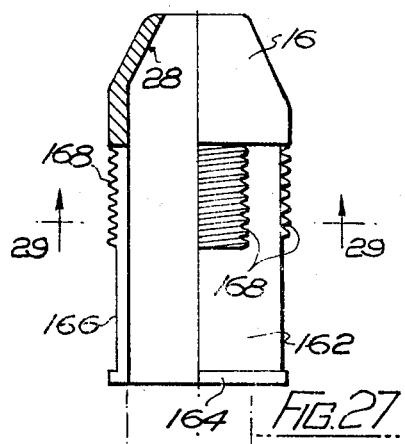
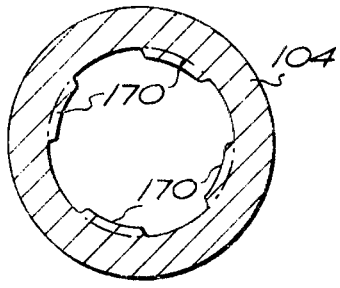
FIG.27
FIG.30
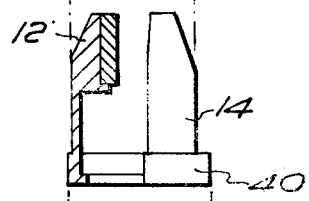
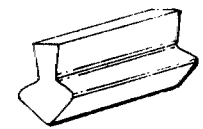
FIG.31
FIG.32
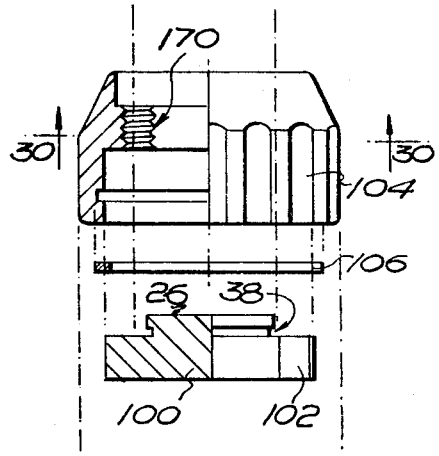
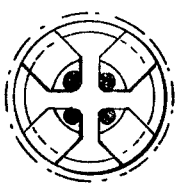
FIG.33
FIG.34
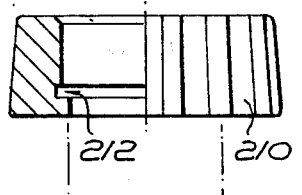
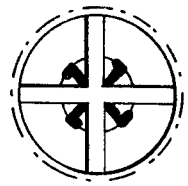
FIG.35
FIG.36
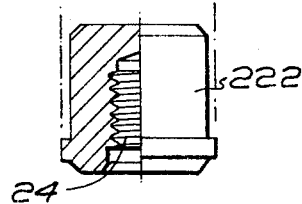

DRILL CHUCKS

The invention relates to drill chucks and has for its object to provide an improvement therein.

According to the invention, a drill chuck is provided with three or more jaw elements connected by means of flexible elements to a jaw carrier, said jaw elements being of tapered form and being arranged to bear against a frusto-conical portion of a bore of a nose cone, means being provided for urging said jaw elements axially relative to said nose cone so that the jaw elements are urged radially inwards, accompanied by flexing of the flexible elements, to grip the shank of a drill bit which has been placed in the chuck. The flexible elements may be made of a synthetic plastics material and may be moulded integrally with the jaw elements. Alternatively, said flexible elements may be made of spring steel and provided with means whereby they can be "snap-fitted" or otherwise connected to the jaw elements. The jaw elements, when made of a synthetic plastics material or cast in soft metal, may be provided with hard metal inserts which will engage a drill shank carried by the chuck.

The required relative axial movement between the jaw elements and the nose cone may be effected by screwthreaded adjustment of the latter along a screwthreaded portion of the jaw carrier, and in this case the flexible elements may be formed integrally with said jaw carrier or may be releasably connected thereto, conveniently by "snap-in" connection means at the ends of the flexible elements remote from the jaws. The screwthreaded adjustment of the nose cone along a screwthreaded portion of the jaw carrier may be facilitated by a tommy-bar capable of being fitted in at least one radial hole provided in the nose cone, or by a pair of tommy-bars capable of being fitted in respective radial holes provided in the nose cone and in the jaw carrier. Alternatively, the screwthreaded adjustment of the nose cone along a screwthreaded portion of the jaw carrier may be facilitated by a ring spanner capable of being engaged with a non-circular exterior portion of the nose cone, or by a pair of ring spanners capable of being engaged with respective non-circular portions of the nose cone and of the jaw carrier. Conversely, the screwthreaded adjustment of the nose cone along a screwthreaded portion of the jaw carrier may be facilitated by a geared key a pilot portion of which is capable of being engaged with a radial hole in the jaw carrier or in a part carried by said jaw carrier, said geared key being capable of being engaged with the teeth of a geared ring formed integrally with or connected to the nose cone. In this case a plurality of radial holes may be provided in the jaw carrier for engagement by the pilot portion of the geared key, said holes being arranged helically around a cylindrical portion of the jaw carrier so that an appropriate one of said holes can be selected for engagement by said pilot portion of the geared key according to the axial location of the geared ring along said jaw carrier when a final tightening of the jaw elements on the shank of a drill bit is to be effected. Alternatively, a slidable element may be provided in a longitudinally extending slot in a cylindrical portion of the jaw carrier, said slidable element being provided with a hole radial to said jaw carrier for the reception of the pilot portion of the geared key, and the axial location of the slidable element along its slot being controlled by the position of the geared ring along the jaw carrier so that the proper engagement of the teeth of said geared key with the teeth of the geared ring is maintained. Conversely, a cam-like collar element may surround a cylindrical portion of the jaw carrier and abut at one side against an inclined shoulder having a plurality of radial notches formed on said jaw carrier, said collar element being provided with the hole in which the pilot portion of the geared key can be engaged, the arrangement being such that said collar element can be appropriately positioned, with a projection with which it is provided engaging a selected one of the notches in the inclined shoulder of the jaw carrier, so that when the jaw elements have been urged axially relative to the nose cone a distance sufficient to bring them into engagement with the shank of a drill bit which is to be gripped, the geared key can be applied to the chuck to effect the final tightening. The screwthreaded portion of the jaw carrier may be formed as a sleeve snapped on a spigot portion of the carrier and secured thereon against rotation.

Alternatively, the required relative axial movement between the jaw elements and the nose cone may be effected by a screwthreaded driving spindle of a power tool being screwed through a screwthreaded bore of an end plug on which the cone is secured whereby an end face of said driving spindle abuts against and axially displaces the jaw carrier to which the flexible elements are connected or with which they have been integrally formed.

In a further construction, the relative axial movement between the jaw elements and the nose cone may be effected by means of a sleeve encircling a generally cylindrical skirt portion of the nose cone and having screwthreaded engagement therewith, said sleeve being capable of imparting axial movement to the jaw carrier within the skirt portion through axially extending slots in said skirt portion. In this case, the jaw carrier may be provided with key elements extending radially outwards through the slots in the skirt portion of the nose cone, a connection being established between said key elements and the sleeve so that the latter can rotate relative to the jaw carrier, and the screwthreaded connection between the sleeve and the skirt portion of the nose cone may be by way of circumferentially spaced and axially extending threaded spline portions, the arrangement being such that when a drill bit has been entered into the chuck the sleeve element can first be slid forward along the skirt portion of the nose cone, with the threaded spline portions of each out of engagement, so that the jaw elements are brought into engagement with the frusto-conical portion of the bore of the nose cone and thus moved radially inwards to lightly grip the surface of the shank of the drill bit, and then the sleeve element can be turned to bring its threaded spline portions into engagement with the threaded spline portions of the skirt portion of the nose cone whereby a tight locking action can be applied to provide a tight grip of the jaw elements on the shank of the drill bit.

Figure 2:
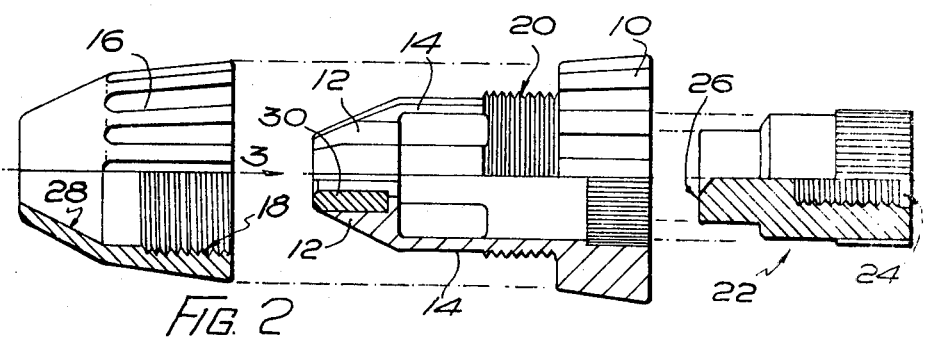
Figure 3:
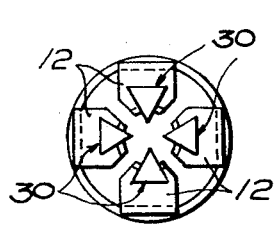
Figure 4:
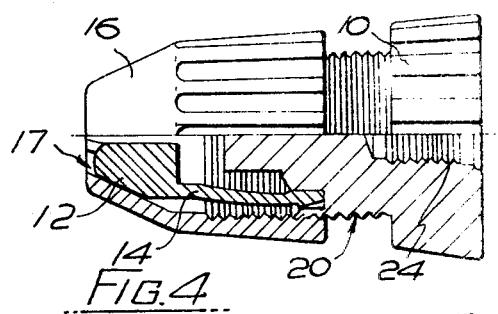
Figure 5:
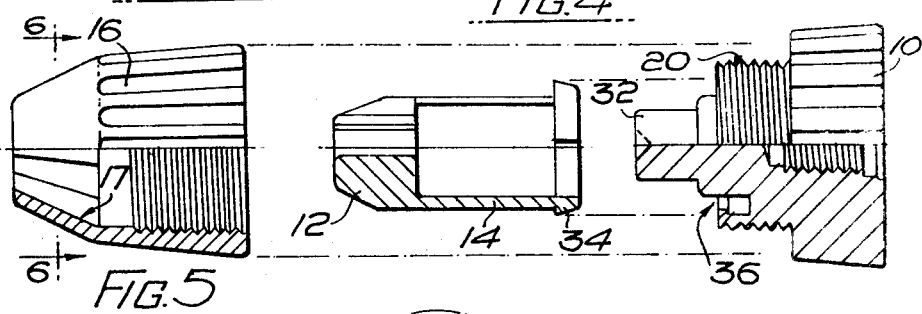
Figure 6:
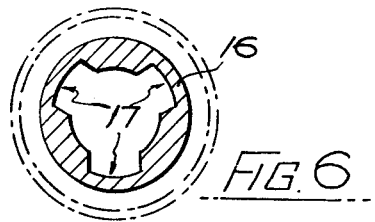
Figure 7:
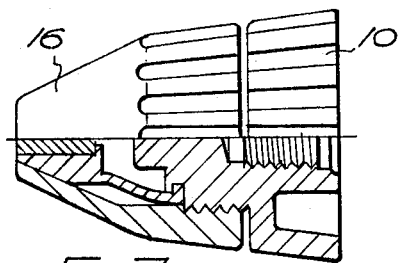
Figure 9:
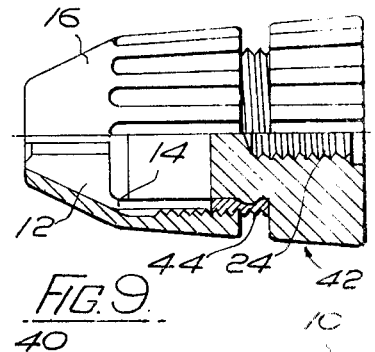
Figure 8:
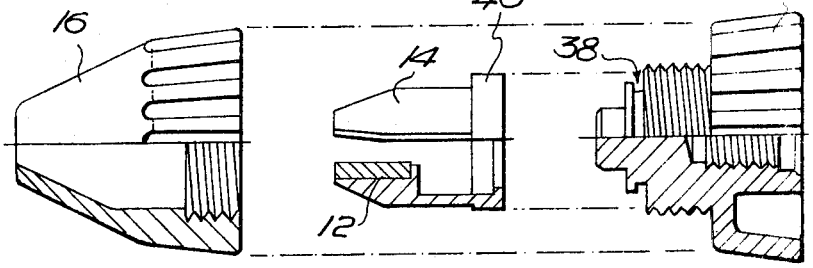
Figure 10:
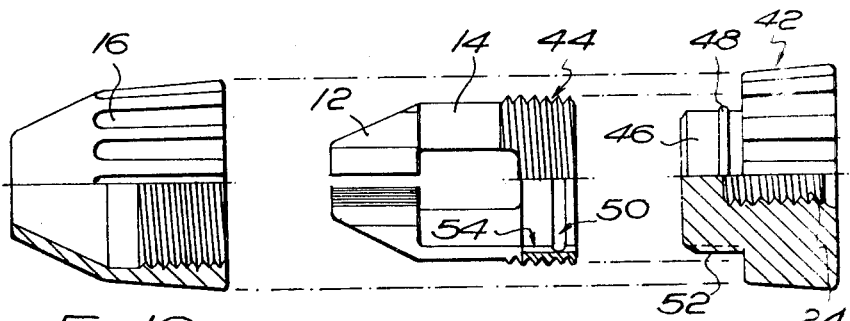
Figure 11:
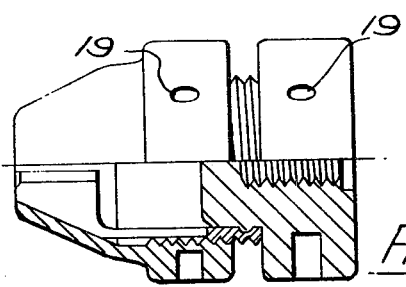
Figure 18:
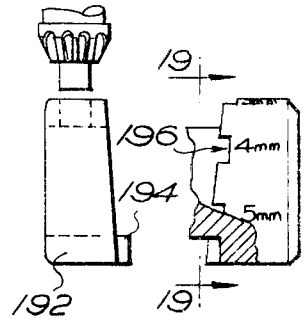
Figure 19:
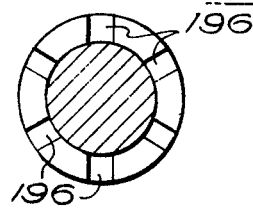
Figure 20:
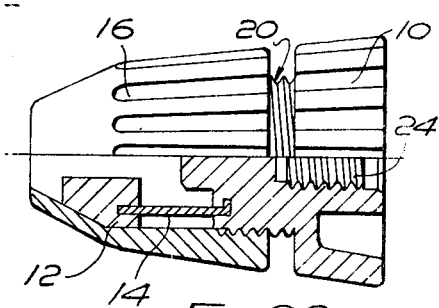
Figure 21:
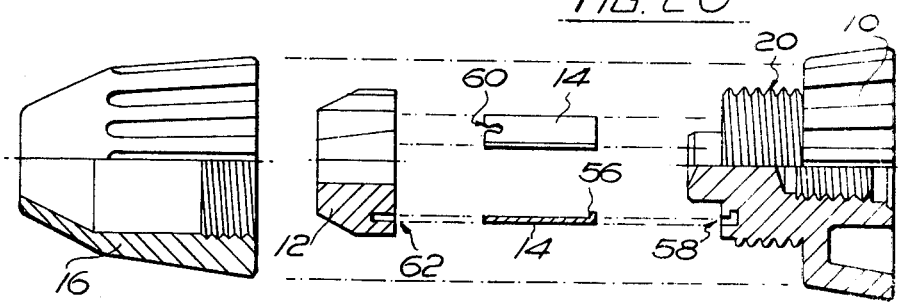
Figure 22:
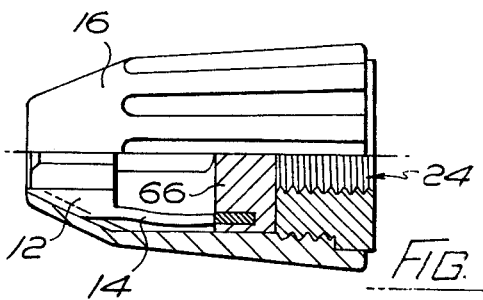
Figure 23:
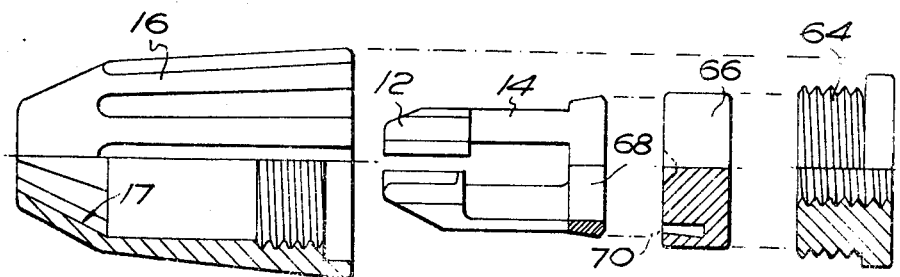
Figure 24:
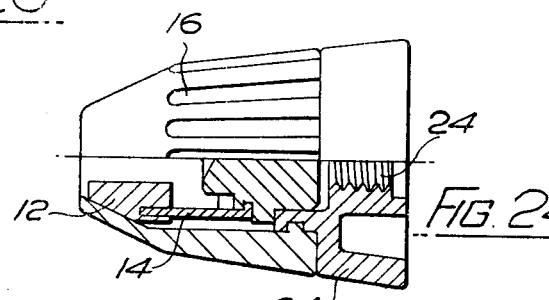
Figure 25:
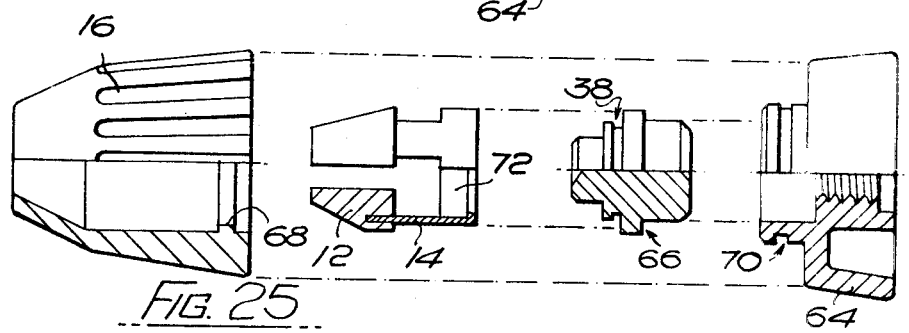
Figure 26:
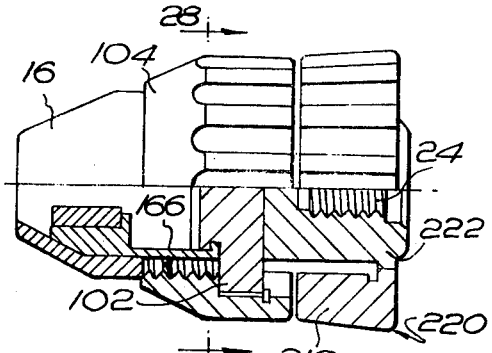
Figure 28:
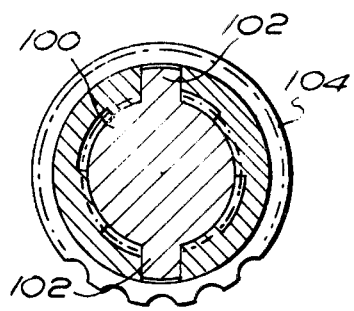
Figure 29:
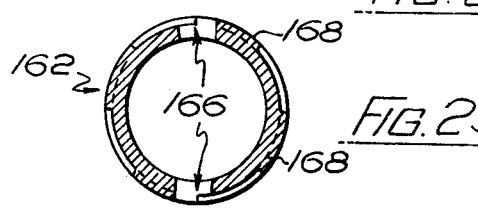

In order that the invention may be fully understood and readily carried into effect, the same will now be described, by way of example only, with reference to the accompanying drawings, of which:

FIG. 1 is a part-sectional view of one form of drill chuck embodying the invention, FIG. 2 is an exploded view thereof, and FIG. 3 is a view in the direction of arrow 3 in FIG. 2, that is to say an end view of one of the components of the chuck, FIG. 4 is a view similar to FIG. 1 of a modified form of chuck embodying the invention, FIG. 5 is an exploded view thereof, and FIG. 6 is a sectional view on the line 6—6 in FIG. 5, FIG. 7 is a further view similar to FIG. 1 and illustrating a further modified form of chuck embodying the invention, and FIG. 8 is an exploded view thereof, FIG. 9 is a still further view similar to FIG. 1 and illustrating a still further modified form of chuck embodying the invention, and FIG. 10 is an exploded view thereof, FIG. 11 is a part-sectional view illustrating a possible modification of the chuck shown in FIGS. 9 and 10, FIGS. 12 and 13, FIG. 14, FIGS. 15 and 16 and FIGS. 17 to 19 are views which will presently be referred to when describing further possible modifications of the chuck shown in FIGS. 9 and 10, FIG. 20 is yet a further view similar to FIG. 1 and illustrating a further modified construction, and FIG. 21 is an exploded view thereof, FIG. 22 is a view similar to FIG. 1 but illustrating a rather different form of chuck embodying the invention, and FIG. 23 is an exploded view thereof, FIG. 24 is a part-sectional view illustrating a modification of the chuck shown in FIGS. 22 and 23, and FIG. 25 is an exploded view thereof, FIG. 26 is a part-sectional view illustrating a very different form of chuck embodying the invention, FIG. 27 is an exploded view thereof, FIG. 28 is a sectional view on the line 28—28 in FIG. 27, FIGS. 29 and 30 are sectional views on the lines 29 — 29 and 30 — 30 respectively in FIG. 28, and FIGS. 31 to 36 are further views which will be referred to when describing further possible modifications.

Referring now to FIGS. 1 to 3 of the drawings, the drill chuck there illustrated includes a jaw carrier 10, four equally spaced jaw elements 12 connected by means of flexible elements 14 to said jaw carrier, and a nose cone 16 a screwthreaded bore portion 18 of which engages a screwthreaded portion 20 of the jaw carrier. The chuck also includes a combined end plug and mount generally indicated 22 which is force fitted in the hollow interior of the jaw carrier from its end remote from the jaw elements, a splined connection being provided between the two parts so that full driving torque can be transmitted from the mount to the jaw carrier. The mount is provided with a threaded bore 24 for the reception of a power tool driving spindle (not shown). At its end which is located within the jaw carrier, the end plug and mount 22 is dimpled at 26 to provide a centering location for an end of a drill bit which is to be held in the chuck.

As best seen in FIG. 2, the jaw elements are of tapered form and are arranged to bear against a frustoconical portion 28 of the bore of the nose cone. The arrangement is such that when the jaw elements are urged axially relative to the nose cone, by the screwthreaded adjustment of the latter along the screwthreaded portion of the jaw carrier, the jaw elements are urged radially inwards to grip the shank of a drill bit which has been placed in the chuck. The radially inward movement of the jaw elements is of course allowed by the flexing of the flexible elements 14, and when the nose cone is subsequently slackened, that is to say backed off the screwthreaded portion of the jaw carrier, the flexible elements are then able to assume their former condition and re-open the jaw elements.

In this embodiment the jaw carrier 10 has been moulded in a synthetic plastics material, integrally with the flexible elements 14 and with the jaw elements 12 (and it will be seen in FIGS. 2 and 3 that each jaw element has in this instance been provided with a moulded-in metal insert 30 of triangular cross section). However, it is not essential that all the component parts should be made of plastics or that the jaw carrier, flexible elements and jaw elements should be formed integrally together as will become more apparent from the further description concerning modified forms of drill chucks embodying the invention. To facilitate the tightening and untightening of the chuck the outer surface of the nose cone and the periphery of the jaw carrier are shown to have been given a fluted form (but it will be understood that these could equally well have been knurled, or moulded with a knurled external appearance for example, to provide the required non-slip hand grip).

Referring now to FIGS. 4 to 6, in a modification of the chuck described above the jaw carrier 10 has been moulded integrally with a portion constituting a dimpled end stop 32 and has also been formed with the threaded bore 24 for the reception of a power tool driving spindle. In this case however, the jaw elements 12, which have been moulded integrally with the flexible elements 14, have been formed separate from the jaw carrier, but means have been provided whereby they have been able to be connected thereto by "snap-in" connection means constituted by a radially lipped ring part 34 moulded integrally with the flexible elements and an undercut annular cavity 56 formed in an end face of the jaw carrier for the reception of said ring part. A further modification which will be observed in this case is that guideways 17 extend along the frustoconical portion of the bore of the nose cone. These support the jaw elements as the latter are displaced relative to said nose cone and the jaw elements are restrained against "toggle" action. (The jaw elements are able to be guided in this way in this particular case by virtue of the fact that as the nose cone is rotated, the radially lipped ring part 34 with which the jaw elements are connected is able to rotate in the cavity 36 formed in the jaw carrier).

In FIGS. 7 and 8 there is illustrated a form of chuck very similar to that just described except that the means whereby the jaw elements and integrally formed flexible elements have been able to be connected to the jaw carrier are rather different. In this case the jaw carrier 10 is provided with a circumferential groove 38 and the flexible elements are moulded integrally with an internally lipped ring 40, the latter being a split ring so that its lip is able to be engaged in the groove in the jaw carrier, being retained therein as the nose cone is engaged with the screwthreaded portion of the jaw carrier. The arrangement is such that the jaws and the flexible elements can rotate relative to the jaw carrier as screwthreaded adjustments of the nose cone along the screwthreaded portion of the jaw carrier are made. Consequently, the flexible elements are safeguarded against twisting and the jaw elements are safeguarded against "toggle" action. (It will be understood that, if preferred, the jaw elements could in this case also be located in guideways in the nose cone).

Referring now to FIGS. 9 and 10, in a different modification of the first described embodiment the jaw carrier is a two-part member, being formed in part by a member generally indicated 42, which includes the threaded bore 24, and in part by a screwthreaded sleeve 44 which is moulded integrally with the jaw elements 12 and the flexible elements 14. The sleeve 44 is a snap fit on a spigot portion 46 which has been moulded integrally with the member 42, the two parts having been formed with snap ring and groove portions indicated 48 and 50 respectively and with co-operating key and slot portions indicated 52 and 54 respectively by means of which they are secured against relative rotation. When assembled, this form of chuck can be operated in the manner of the chuck illustrated in FIGS. 1 to 3 and the end face of the spigot portion 46 of the member 42 acts as an end stop for the abutment of the shank of a drill bit.

Referring now to FIG. 11, in a modification of the chuck just described, the fluted exterior surfaces of the nose cone and of the jaw carrier have become plain cylindrical surfaces except for the provision of a number of radial holes 19 in each. A pair of tommy-bars 21 are shown to be provided and are capable of being fitted in respective holes in said nose cone and jaw carrier for the purpose of facilitating the screwthreaded adjustment of the nose cone along the screwthreaded portion of the jaw carrier. (It will of course be understood that, if preferred, the nose cone alone could be provided with the series of radial holes or that only a single tommy-bar be provided to be used initially for very tightly fixing the jaw carrier on the driving spindle of a power tool and subsequently for turning the nose cone when the shank of a drill bit is to be held by the chuck).

In FIGS. 12 and 13 there is illustrated a different and perhaps preferable way of achieving the same object, a pair of ring spanners 23 being provided for engagement with the fluted exterior shape of the nose cone and jaw carrier. In this way the facility of convenient hand tightening prior to the final tightening by the ring spanners is retained. (Here again it will be understood that, if preferred, a single such ring spanner could be provided. It will also be understood that the nose cone and jaw carrier could be of any other non-circular exterior shape, the ring spanner, or each ring spanner, as the case may be, then being of complementary shape).

Referring now to FIG. 14, this illustrates a construction of chuck similar to that illustrated in FIGS. 9 and 10 but in which the screwthreaded adjustment of the nose cone along the screwthreaded portion of the jaw carrier is facilitated by a geared key, generally indicated 172, a pilot portion 174 of which is capable of being engaged, as shown, with one of a plurality of radial holes 176 in the jaw carrier and gear teeth of which are capable of being engaged, also as shown, with the teeth of a geared ring 178. The geared ring is connected to the nose cone 16, as shown, by a snap-in connection indicated 180 constituted by an inturned flange portion of the nose cone and a groove in the geared ring component. In addition, a key and slot connection indicated 182 is provided to lock the two components together against relative rotation when the chuck is tightened.

It will be observed that the holes 176 are arranged helically around a cylindrical portion of the jaw carrier. This is so that an appropriate one of said holes can be selected for engagement by the pilot portion of the geared key according to the axial location of the geared ring along said jaw carrier when a final tightening of the jaw elements on the shank of a drill bit is to be effected. An initial adjustment to bring the jaw elements into engagement with the shank of the drill bit can of course be effected by hand.

Referring now to FIGS. 15 and 16, the chuck there illustrated is basically similar to that just described except that instead of the plurality of radial holes 176 in the cylindrical portion of the jaw carrier the latter has been provided with a longitudinally extending slot 184 in which a slidable element 186 has been fitted. The element 186 is provided with a hole 188 which is radial to the jaw carrier for the reception of the pilot portion 174 of the geared key 172. An undercut circumferential groove within the geared ring receives a raised lip 190 at one end of the slidable element 186, as shown, so that the geared ring is allowed to rotate but carries with it, as it moves longitudinally, the slidable element 186 so that the proper engagement of the teeth of the geared key with the teeth of the geared ring is constantly maintained.

Figure 17:
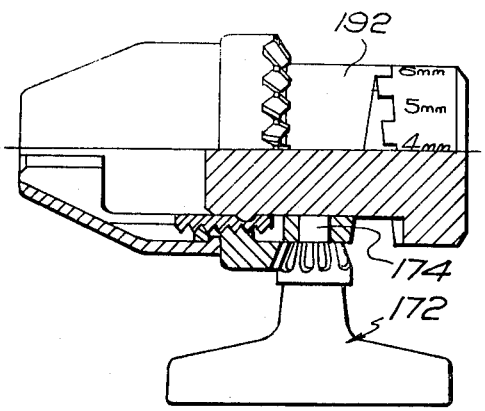

In FIGS. 17 to 19 there is illustrated another construction which is basically similar to that described with reference to FIG. 14, but in this case instead of the plurality of radial holes 176 in the cylindrical portion of the jaw carrier the latter is surrounded by a cam-like collar element 192 which abuts at one side against an inclined shoulder formed on said jaw carrier, the collar element being provided with the hole in which the pilot portion 174 of the geared key 172 can be engaged as shown. The collar element is also provided with a projection 194 which can be engaged with a selected one of a plurality of radial notches 196 formed in the inclined shoulder of the jaw carrier, and the arrangement is such that when the jaw elements have been urged axially relative to the nose cone a distance sufficient to bring these into engagement with the shank of a drill bit which is to be gripped (conveniently by manual rotation of the nose cone) the geared key can be applied to the chuck to effect the final tightening and the teeth of the key will then be found to engage properly with the teeth of the geared ring. The radial notches in the jaw carrier are marked so that the appropriate one can be engaged by the projection on the collar element according to the size of drill bit which is to be gripped. The collar element can be released for re-positioning relative to the inclined shoulder of the jaw carrier by slackening back the geared ring away from said collar element.

Referring now to FIGS. 20 and 21, there is there illustrated a chuck which in some ways is very similar to those previously described with reference to FIGS. 4 to 6 and FIGS. 7 and 8 in that the jaw carrier 10 is formed integrally with the screwthreaded portion 20 with which the nose cone has screwthreaded engagement and also in that it is provided with the threaded bore 24 for the reception of a power tool driving spindle. However, in this case the jaw elements 12 have been formed separately from the flexible elements 14 and indeed the latter have been made of spring steel strip. Each flexible element is formed at one end with an inturned portion 56 which can be retained in a slot 58 in an end face of the jaw carrier. At its other end each flexible element has a notch 60, as shown, and the arrangement is such that it can be inserted in a slot 62 in the jaw element which it is to carry and can "snap-lock" therein about a pin element or formation which extends across the slot.

In a rather different form of chuck which is illustrated in FIGS. 22 and 23 the operating principle is still the same as in the previous embodiments in that the jaw elements 12 are carried by flexible elements 14 and in that means are provided for urging the jaw elements axially relative to the nose cone 16 so that the jaw elements are urged radially inwards to grip the shank of a drill bit. However, in this case the nose cone is tightly and permanently screwthreaded onto an end plug 64 through which extends the threaded bore 24 for the reception of a power tool driving spindle. The means which are provided for urging the jaw elements axially relative to the nose cone so that said jaw elements are urged radially inwards to grip the shank of a drill bit are constituted by a jaw carrier 66 which is slidably mounted within a cylindrical portion of the bore of the nose cone, said jaw carrier being shown in FIG. 22 in abutment with an end face of the plug 64 but being capable of moving away from the end plug to urge the jaw elements axially relative to the nose cone when acted on by the end of a power tool driving spindle protruding through the threaded bore 24 of the end plug (and when this form of chuck is to be used the power tool driving spindle will be provided with an extra long screwthreaded portion). The jaw elements 12 are moulded integrally with the flexible elements 14 and with a ring part 68. The jaw carrier 66 has been formed with an annular groove 70 for the reception of the ring part 68 from which the flexible elements 14 extend and also with a dimple 26 to provide a centering location for the end of a drill bit which is to be held in the chuck. It will be observed that guideways 17 extend along the frusto-conical portion of the bore of the nose cone as in the embodiment described with reference to FIGS. 4 to 6. These guide the jaw elements along straight paths as they are urged axially relative to the nose cone (and of course they are able to be guided in this way in this particular case by virtue of the fact that tightening is effected without rotation of the nose cone relative to the jaw carrier).

It will be understood that the operation of this form of chuck is rather different from any of the other chucks previously described in that to open or close the jaws the whole chuck is rotated upon the power tool driving spindle (but as previously explained this still results in the jaw elements being urged axially relative to the nose cone). An advantage of this form of chuck is that during a drilling operation the torque applied to the drill bit will tend to tighten the chuck upon the power tool driving spindle and thus to exert a greater axial thrust against the jaw carrier. Consequently, the greater the applied torque the greater will be the gripping force of the jaw elements on the shank of the drill bit.

The chuck which is illustrated in FIGS. 24 and 25 operates in a manner exactly the same as that just described with reference to FIGS. 22 and 23 but in this case the nose cone is connected to the end plug 64 (through which extends the threaded bore for the reception of a power tool driving spindle) by means of a "snap-lock" connection which holds them against relative axial movement, that is to say, the nose cone is provided with an internal ring part 68 and a spigot portion of the end plug is provided with a groove 70 into which said ring part can be snap fitted. A further difference is that the flexible elements 14 which carry the jaw elements 12 have in this case been made of spring steel integral with a portion which forms an internally lipped split ring 72. The jaw carrier 66 is in this case formed with a circumferential groove 38 with which the internal lip of the split ring is engaged.

As previously mentioned, this construction of chuck operates in the same way as that described with reference to FIGS. 22 and 23, that is to say, the whole chuck is rotated on the power tool driving spindle to bring the end of the spindle into engagement with the jaw carrier and to displace the latter axially relative to the nose cone.

Referring now to FIGS. 26 to 30, in a very different form of drill chuck embodying the invention the nose cone 16, within a frusto-conical portion 28 of which the tapered portions of the jaw elements 12 bear, is formed integrally with a parallel bore skirt portion 162 an end of which, remote from the conical part, is provided with a peripheral flange 168. Said peripheral flange of the skirt portion is received in a groove 212 formed within an externally fluted collar 210 which forms part of a mount generally indicated 220 in FIG. 26. Another part of the mount is formed by an end plug 222 (formed with a screwthreaded bore 24 for the reception of a power tool driving spindle) which is a force fit in the parallel bore of the skirt portion 162 so that it retains the latter within the collar 210. The flanged end of the skirt portion of the nose cone has been able to be inserted within the collar 210 by virtue of the fact that said skirt portion has a pair of open ended diametrically opposed slots 166 which have allowed the skirt portion to be inwardly deformed to bring the flange 164 into engagement with the groove 212.

The chuck also includes a jaw carrier assembly which comprises the jaw elements 12 moulded integrally with the flexible elements 14 and with the internally lipped ring 40; a carrier member 100 which is formed with oppositely disposed key elements 102; and an externally fluted sleeve element 104 within which the radially outer portions of the key elements of the carrier member are secured by means of a circlip 106 so that the sleeve can be rotated relative to said carrier member. The carrier member is provided with a flanged spigot portion which defines a circumferential groove 38 in which the inwardly extending lip of the ring 40 (which is a split ring) can be engaged, being retained therein by the skirt portion of the nose cone as the jaw elements are passes therethrough into engagement with the frusto-conical portion 28 of its bore. As the jaw elements and integrally formed flexible elements slide along the bore of the skirt portion of the nose cone, the key elements 102 of the carrier member 100 slide along the slots 166 and the sleeve element 104 encircles the skirt portions.

As shown in FIGS. 27 and 29, the skirt portion of the nose cone is provided with four circumferentially spaced and axially extending threaded spline portions 168 on its outer periphery and these can be engaged by similarly threaded internal spline portions 170 which are provided, as shown, within the bore of the sleeve element 104 of the jaw carrier assembly.

The arrangement is such that when a drill bit has been entered into the chuck to abut against the end face of the carrier member 100 (which has been formed with a dimple 26 to centre the bit) the sleeve element 104 can be slid forwards along the skirt portion of the nose cone, with the threaded spline portions of each out of engagement of course, so that the jaw elements are brought into engagement with the frusto-conical portion of the bore of the nose cone and thus moved radially inwards to lightly grip the surface of the shank of the drill bit. When no further forward movement can be imparted by manual pressure applied axially to the sleeve element 104, the sleeve element is turned to bring its threaded spline portions into engagement with the threaded spline portions of the skirt portion of the nose cone. A tight locking action can then be applied to provide a tight grip of the jaw elements on the shank of the drill bit.

Various modifications may be made to any of the drill chucks described without departing from the scope of the invention. For example it will be understood that although the various drill chucks described above have been designed to be manufactured largely of synthetic plastics materials, various component parts could equally well be made of metal. The combined end plug and mount 22 in the chuck illustrated in FIGS. 1 to 3 could have been made of metal (and of course would almost certainly be made of metal if provided with an externally screwthreaded spigot portion for connection to a power tool driving spindle or if provided with a Morse or similar taper mount). Various other components could be made as diecastings (but of course if the jaw elements are to be diecast or made of sintered metal or machined from solid metal they will be made separately from the flexible elements which carry them, the flexible elements either being made of spring steel or of a synthetic plastics material). If the jaw elements are moulded of a synthetic plastics material (whether integrally with the flexible elements or separately therefrom) either the plastics material will be a very hard material or of course the jaw elements will be provided with moulded-in metal inserts as in the case of the chuck illustrated in FIGS. 1 to 3. In this connection it will be understood that in any of the chucks described and illustrated the jaw elements could be three or four in number or in fact more than four in number. It will also be understood that a hard metal insert in a plastics moulded jaw element or in a jaw cast in some relatively soft metal need not necessarily be of triangular cross section as shown in FIG. 3. For example, FIG. 31 is an end view of a four jaw moulded part each jaw element being provided with an insert as shown in perspective view in FIG. 32; FIG. 33 is an end view of a four jaw moulded part each jaw element being provided with a generally cylindrical but longitudinally serrated insert as shown in perspective view in FIG. 34; and FIG. 35 is an end view of a four jaw moulded part each jaw element being provided with an angle section insert as shown in perspective view in FIG. 36. The inserts themselves may be of sintered metal or machined from solid metal as preferred. In the chuck illustrated with reference to FIGS. 7 and 8 and in FIGS. 26 to 30 the rings 40, with which the flexible elements are moulded, are said to be split rings. However, it will be understood that, being made of a synthetic plastics material, the rings need not necessarily be split rings and that they could snap into engagement with the grooves 38. It will also be understood that in the case of the chuck described with reference to FIGS. 26 to 30 the screwthreaded connection between the sleeve 104 and the skirt portion 162 of the nose cone need not necessarily be by way of circumferentially spaced and axially extending threaded spline portions. The screwthreads could be full screwthreads (except of course for the diametrically opposed slots in the skirt portion of the nose cone). However, in this case there would be no provision for quick variation from a very small size of adjustment to a much larger size and vice versa. Any of the chucks may have provision for the attachment of a short bar or key to facilitate the tightening of the chuck on a power tool driving spindle or its removal therefrom, or as a means of holding the main body of the chuck against rotation whilst the user tightens or untightens the chuck by hand as in the case of the chucks illustrated in FIG. 11 and in FIGS. 12 and 13.

It will be understood that in a chuck embodying the invention the flexibility of the flexible elements will be such that throughout its range of adjustment the clamping surfaces of its jaws are able to align themselves with the axis of the chuck as they bear against the shank of a drill bit and also that the jaws simultaneously mate correctly with the frusto-conical portion of the bore of the nose cone.

What I claim and desire to secure by Letters Patent is:

1. A drill chuck comprising at least three jaw elements each having a conical tapered exterior surface of diminishing radii in the direction of the end thereof, a jaw carrier; respective flexible elements connecting said jaw elements to said jaw carrier, said flexible elements each being coextensive in arcuate dimension with the maximum arcuate dimension of the conical jaw element to which it is connected; a nose cone having a frusto-conical bore portion; and means for urging said jaw elements axially relative to said nose cone so that the jaw elements act against the frusto-conical bore portion of the nose cone and are urged radially inwards, accompanied by flexing of the flexible elements, to grip the shank of a drill bit placed in the chuck.

2. A drill chuck according to claim 1, in which the flexible elements are made of a synthetic plastics material and are moulded integrally with the jaw elements.

3. A drill chuck according to claim 1, in which the flexible elements are made of spring steel and are provided with means for being connected to the jaw elements.

4. A drill chuck comprising at least three jaw elements each having a conical tapered exterior surface of diminishing radii in the direction of the end thereof, a nose cone; a jaw carrier; respective flexible elements connnecting said jaw elements to said jaw carrier, said flexible elements each being coextensive in arcuate dimension with the maximum arcuate dimension of the conical jaw element to which it is connected; a nose cone having a frusto-conical bore portion, and means for urging said jaw elements axially relative to said nose cone, said means being constituted by screwthreaded adjustment means for adjusting the nose cone along the jaw carrier, so that the jaw elements act against the frusto-conical bore portion of the nose cone and are urged radially inwards, accompanied by flexing of the flexible elements, to grip the shank of a drill bit placed in the chuck.

5. A drill chuck according to claim 4, in which the flexible elements are releasably connected to the jaw carrier by a ring and groove connection means at the ends of the flexible elements remote from the jaws.

6. A drill chuck according to claim 4, in which said screw threaded adjustment means includes cooperating threaded portions on said nose cone and jaw carrier, and at least one radial hole provided in the nose cone whereby a bar can be received in said radial hole to facilitate threaded adjustment of the nose cone along the screw threaded portion of the jaw carrier.

7. A drill chuck according to claim 4 in which said screw threaded adjustment means includes cooperating threaded portions on said nose cone and jaw carrier, and said nose cone is provided with a fluted exterior portion whereby a wrench can engage the fluted portion of the nose cone to facilitate threaded adjustment of the nose cone along the screw threaded portion of the jaw carrier.

8. A drill chuck according to claim 4, in which said screw threaded adjustment means includes cooperating threaded portions on said nose cone and jaw carrier, at least one radial hole is provided in the jaw carrier, and a geared ring is provided on the nose cone, whereby a geared key having a pilot portion capable of being received in the radial hole in the jaw carrier and having gear teeth engagable with the teeth of the geared ring provided on the nose cone to facilitate screw threaded adjustment of the nose cone along a screw threaded portion of the jaw carrier.

9. A drill chuck according to claim 8, in which a plurality of radial holes are provided in the jaw carrier for engagement by the pilot portion of the geared key, said holes being arranged helically around a cylindrical portion of the jaw carrier so that an appropriate one of said holes can be selected for engagement by said pilot portion of the geared key according to the axial location of the geared ring along said jaw carrier when a final tightening of the jaw elements on the shank of a drill bit is to be effected.

* * * * *